Nov. 10, 1970    R. G. JEWELL    3,539,846
DC TORQUER BRUSH ARRANGEMENT
Filed July 25, 1969    5 Sheets-Sheet 1

INVENTOR
RICHARD G. JEWELL
BY
David Blumenfeld
ATTORNEY

Nov. 10, 1970 R. G. JEWELL 3,539,846
DC TORQUER BRUSH ARRANGEMENT
Filed July 25, 1969 5 Sheets-Sheet 2

INVENTOR
RICHARD G. JEWELL
BY David Blumenfeld
ATTORNEY

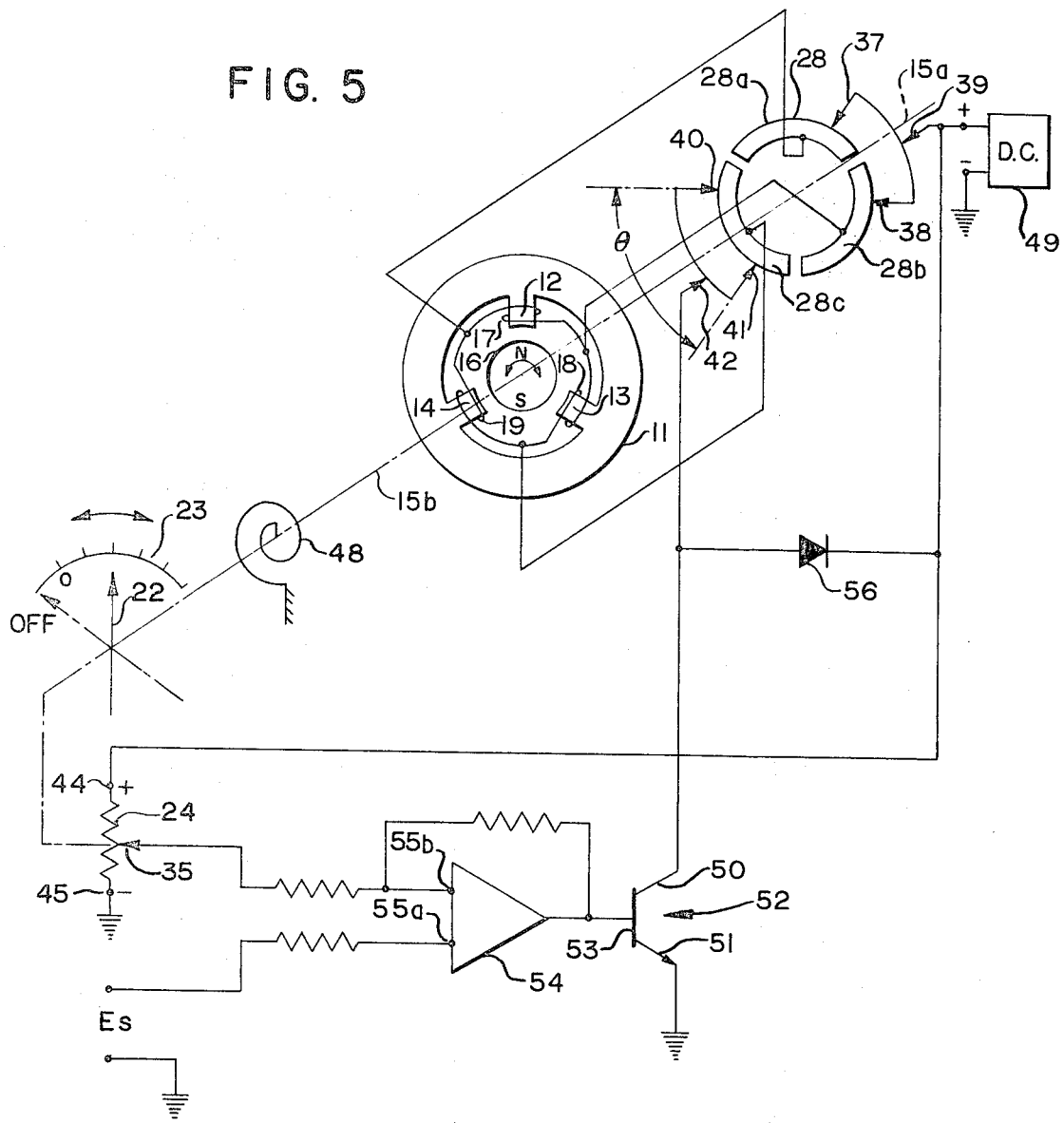

Nov. 10, 1970  R. G. JEWELL  3,539,846

DC TORQUER BRUSH ARRANGEMENT

Filed July 25, 1969  5 Sheets-Sheet 4

INVENTOR.
RICHARD G. JEWELL
BY
David Blumenfeld
ATTORNEY

Nov. 10, 1970     R. G. JEWELL     3,539,846
DC TORQUER BRUSH ARRANGEMENT
Filed July 25, 1969     5 Sheets-Sheet 5

INVENTOR.
RICHARD G. JEWELL
BY David Blumyfeld
ATTORNEY

United States Patent Office 3,539,846
Patented Nov. 10, 1970

3,539,846
DC TORQUER BRUSH ARRANGEMENT
Richard G. Jewell, Swampscott, Mass., assignor to General Electric Company, a corporation of New York
Filed July 25, 1969, Ser. No. 844,874
Int. Cl. H02k 37/00
U.S. Cl. 310—46
10 Claims

ABSTRACT OF THE DISCLOSURE

A torque motor suitable for direct drive of instrument pointer and tape-type displays. A double brush arrangement eliminates peaks in the motor torque-angle characteristic to prevent unstable operation. An integrally formed commutator, slip rings, and follow-up potentiometer construction reduces cost, weight and size.

BACKGROUND OF THE INVENTION

The present invention relates to a torque motor designed for use in a servo system of the null-balance type used to position a controlled device in response to an input signal applied thereto. The motor is especially adapted for positioning the movable parts of indicating instruments to indicate the magnitude of a measured quantity.

Instruments, particularly those used on aircraft, having pointer or tape-type displays, frequently use servo systems of the null-balance type to position the instrument indicator in response to a measurement signal received from a suitable transducer. Such systems utilize a servo or torque motor to drive the instrument to a balanced position determined by a balancing signal received from a follow-up potentiometer driven by the motor. In order to obtain sufficient operating torque from a torque motor of acceptable cost, weight and size it has been common practice heretofore to use reduction gearing between the motor and the output drive shaft. Such gearing not only adds weight and cost but also makes the system difficult to stabilize because of the inertia effects of the gearing and the motor which necessarily operates at a high rate of speed.

Accordingly, it is an object of the present invention to provide a torque motor for use in a servo system that develops the required torque without the use of reduction gearing while meeting the small size, light weight and stability requirements for insturment applications.

A further object of the invention is to provide a torque motor which does not have rapid torque changes during rotation which tend to produce unstable operation of the servo system.

A still further object of the invention is to provide a torque motor which is small in size, light in weight, and can be produced at a lower cost than has been possible heretofore.

Further objects and advantages of the invention will become apparent as the following description proceeds.

SUMMARY

In accordance with the invention there is provided an electric torque motor operated by direct current having a stationary field structure and a magnetized rotor. The commutator, which is formed integrally with the follow-up potentiometer and slip rings, is mounted on the frame for engagement with a rotary brush assembly driven by the motor shaft. The motor torque drives the output shaft and potentiometer in an upscale direction and a biasing spring applies a counter torque to the shaft in a downscale direction. A double commutator brush arrangement is provided which functions to prevent sudden motor torque changes during rotation that tend to cause instability of the servo system in which the motor is designed to be used. The motor torque developed is sufficient to drive direct-connected instrument pointer and tape displays without need for reduction gearing.

For a better understanding of the invention reference should be made to the following detailed description taken in connection with the accompanying drawings.

BRIEF DESCRIPTION OF THE DRAWINGS

FIG. 5 is a schematic view of the torque motor showing how it is mechanically and electrically connected in a servo system used to position an instrument pointer in response to a measurement signal.

DESCRIPTION OF THE PREFERRED EMBODIMENTS

Figure 1:
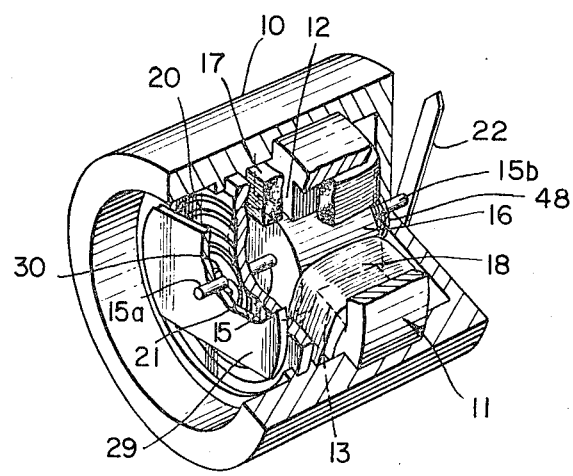
FIG. 1 is a perspective cut-away view of a torque motor embodying the invention.

Referring to FIG. 1 the torque motor comprises a frame 10 which supports a cylindrical field structure 11 of magnetic material having three equally spaced, radially projecting poles 12, 13 and 14. A motor shaft 15 rotating in suitable bearings (not shown) supported by the frame 10 has mounted thereon a cylindrical rotor 16 formed of a permanent magnet material. To reduce weight and increase the motor torque, the rotor is preferably formed of a magnetic material having high coercive force and high residual flux. One such material found to be particularly well suited for this application is an alloy consisting of aluminum (7%), nickel (14.5%) cobalt (35%) titanium (5%), iron (34%) and copper (4.5%) developed by General Electric Company and identified by the name Alnico 8. The rotor is magnetized across a diameter thereof so that a north pole N is formed on one side and a south pole S on the other as shown in FIG. 5. The pole pieces 12, 13 and 14 which surround the rotor in magnetic relation therewith carry field windings 17, 18 and 19 which are preferably connected in delta with the junctions connected to a commutator described below.

Mounted on one end of the motor frame is a stationary plate 20 having a center hole 21 through which one end 15a of the motor shaft 15 projects. The other end of the motor shaft 15b is used to drive a controlled device which may, as shown, be a pointer 22 of an indicating instrument having a stationary scale 23.

Figure 2:
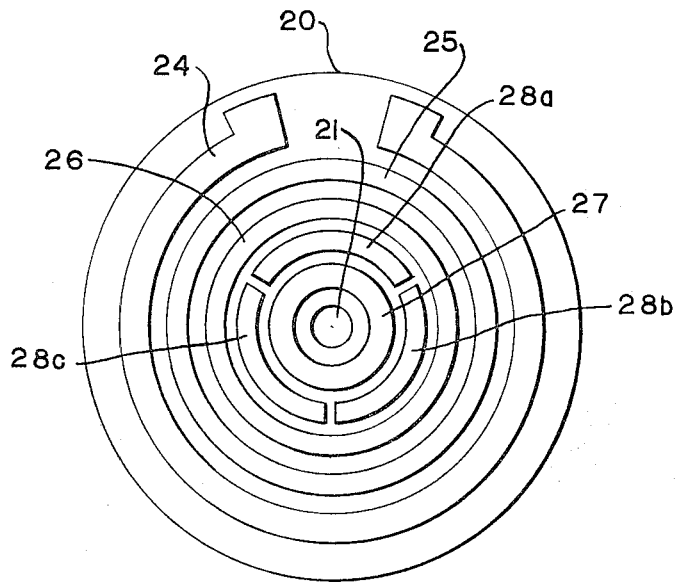
FIG. 2 shows the construction of the integrally formed follow-up potentiometer, slip rings and commutator.

As shown in FIG. 2, the circular plate 20 has integrally formed therewith in the form of radially-spaced and insulated concentric rings formed of electrically conducting material, a potentiometer resistance element 24, three slip rings 25, 26 and 27 and a commutator 28 having three angularly spaced circular segments 28a, 28b and 28c.

The motor shaft end 15a has secured thereto a brush plate 29 formed of electrically insulating material and provided with a central bushing 30 and a set screw 31 by means of which the brush plate is secured to the shaft. The brush plate has projecting from the inner side a series of brushes which bear against and make electrical contact with the potentiometer resistance element 24, the slip rings 25, 26 and 27 and the commutator 28 in a manner to be described.

Figure 3:
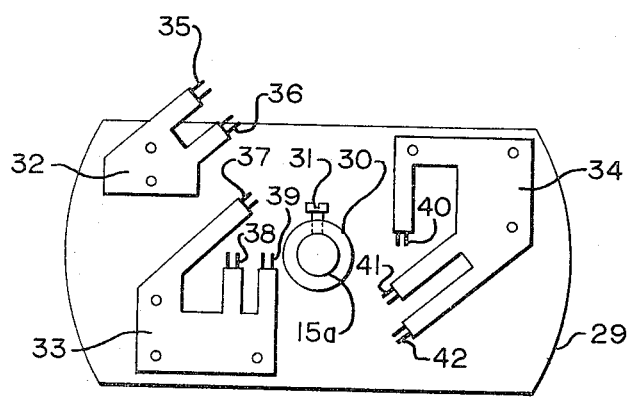
FIG. 3 illustrates the construction of the rotary brush assembly.

Referring to FIG. 3, the inside of the brush plate 29 has three spaced brush assemblies 32, 33 and 34 formed of electrically conducting material and secured to the brush plate in any suitable manner as by riveting. Brush assembly 32 has two bent spring arms extending therefrom carrying at their outer ends brushes 35 and 36 while brush assemblies 33 and 34 each have three spring arms carrying brushes 37, 38, 39 and 40, 41, 42 respectively. The brushes may be formed of fine wires soldered or welded to the spring arms and preferably more than one wire is used for each brush to insure continuous electrical contact with the conducting rings on plate 20.

Figure 4:
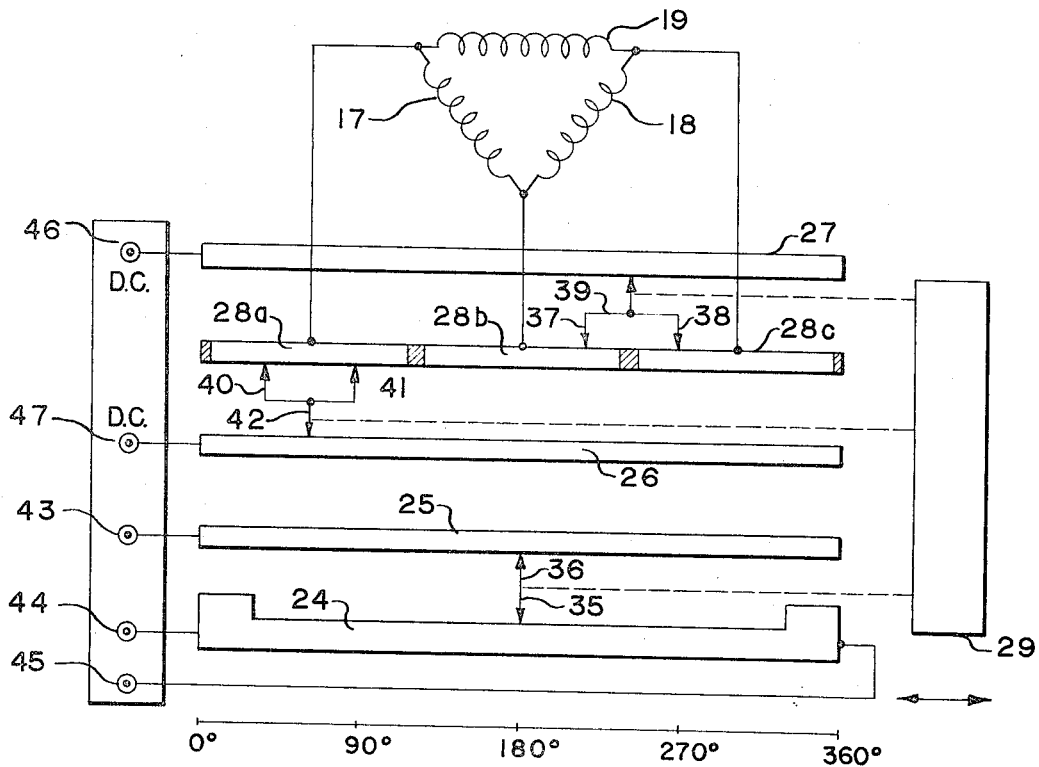
FIG. 4 is a connection diagram showing how the brushes engage the commutator, slip rings, and potentiometer.

The manner in which the electrical connections are made through the brushes to the conducting rings on plate 20 is shown by the connection diagram in FIG. 4. In this diagram the slip rings 25, 26 and 27, the commutator segments 28a, 28b and 28c and the potentiometer resistance element 24 are shown as straight lines rather than circles to facilitate illustration. Three potentiometer connections are made at terminals 43, 44 and 45 so that brush 35 bearing against the resistance element 24 and connected brush 36 bearing on slip ring 25 act as the wiper of the potentiometer positioned by the motor shaft which rotates brush plate 29. Preferably, the resistance element 24 is made of molded conducting plastic for infinite resolution and low friction. Such material is obtainable, for example, from New England Instrument Company, Natick, Mass.

Direct current power is supplied to terminals 46 and 47 and flows through the delta connected motor field windings 17, 18 and 19 in the following manner. From terminal 46, current flows through slip ring 27, brush 39 and paired brushes 37 and 38 to the commutator segments 28a, 28b, and 28c which are connected, as shown to the junctions between the field windings. Current leaves the windings and the commutator through the paired brushes 40 and 41, brush 42 and slip ring 26 to the other power terminal 47.

As shown in FIG. 5, the brushes 37 and 41 and the brushes 38 and 40 are located diametrically opposite on the commutator, the angular spacing between the paired brushes 40, 41 and 37, 38 being indicated by the angle $\theta$.

As the motor shaft and the connected brush assembly rotates, current to the motor field windings is switched by commutator action to produce a rotating field which is followed by the magnetized rotor thus producing motor action.

The function of the double or paired brushes 37, 38 and 40, 41 is to smooth out the torque-angle characteristic of the motor and avoid steep torque gradients during motor rotation which tend to cause jitter, hunting and instability when the motor is used in a closed loop servo system. The manner in which the double brush arrangement switches current in the delta-connected motor field windings is shown in FIGS. 6A, 6B and 6C to which reference will now be made.

Figures 6A, 6B, 6C:
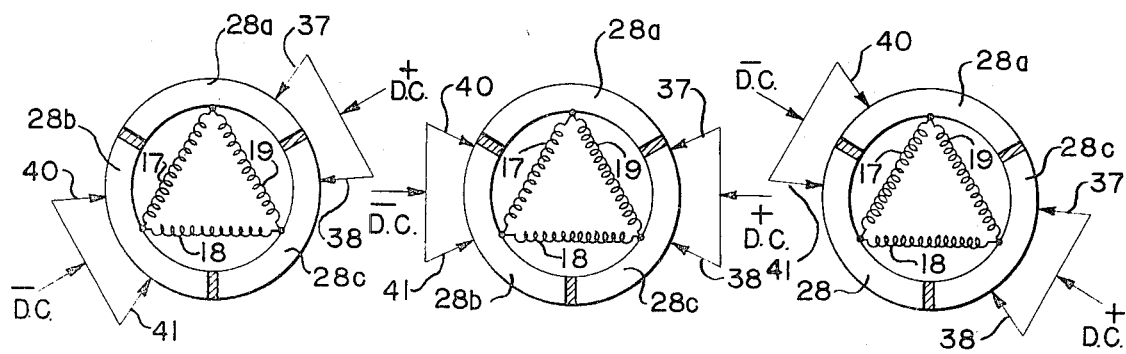
FIGS. 6A, 6B, and 6C are schematic diagrams showing how the commutator double brush arrangement switches current to the motor field windings during rotation of the brushes.

In the brush position shown in FIG. 6A, the paired brushes 37 and 38 interconnect commutator segments 28a and 28c so that field winding 19 is shorted. Paired brushes 40, 41 both engage commutator segment 28b so that field windings 17 and 18 receive full voltage and current. Assuming that the angular width of each of the three commutator segments is slightly less than 120 degress due to the insulation between the commutator segments and that the angular separation between the paired brushes (angle $\theta$) is 50 degrees, this condition continues until the position of FIG. 6B is reached. This occurs after approximately 30 degrees of clockwise rotation of the brushes. In this position paired brushes 37 and 38 engage commutator segment 28c and brushes 40 and 41 engage commutator segment 28b. For this condition field winding 18 receives full voltage and current while windings 17 and 19 are connected in series and so receive only half voltage and current. After 30 degrees of further clockwise rotation of the brushes the position of FIG. 6C is reached. Here the brushes 40 and 41 interconnect segments 28a and 28b and both brushes 37 and 38 engage segment 28c. Thus winding 17 becomes shorted and windings 18 and 19 receive full voltage and current. Thus it will be apparent that as the brushes rotate each field winding will receive in succession, full voltage and current, half voltage and current and no voltage or current being shorted. In this manner a rotating field for motor action is produced.

In a conventional brush arrangement where one set of diametrically-opposite brushes is used, the commutator switching sequence is the same as described above except that the condition where one winding is shorted and the other two receive full power and voltage occurs only during the brief interval when the brush is passing over the insulation between adjacent commutator segments. This assumes that the brush width is sufficient to span the insulation between the commutator segments and momentarily interconnect both segments. The double brush substantially extends the range of angular positions of the brushes during which one field winding is shorted and the other two receive full voltage and current. This greatly strengthens the component of the motor field that produces effective motor torque since the shorted field winding is close to the position in which it would produce a bucking torque. To maximize this effect the angular separation of the paired brushes is preferably selected to be as great as possible without shorting D.C. power supply across one of the commutator segments. For the three segment commutator illustrated this shorting will occur when the angular spacing of the paired brushes approaches 60 degrees. In actual practice good results have been obtained using an angle between the paired brushes lying in the range between 45 degrees and something less than 60 degrees e.g. 50 degrees±5 degrees depending on the commutator segment spacing and manufacturing tolerances.

Figure 7:
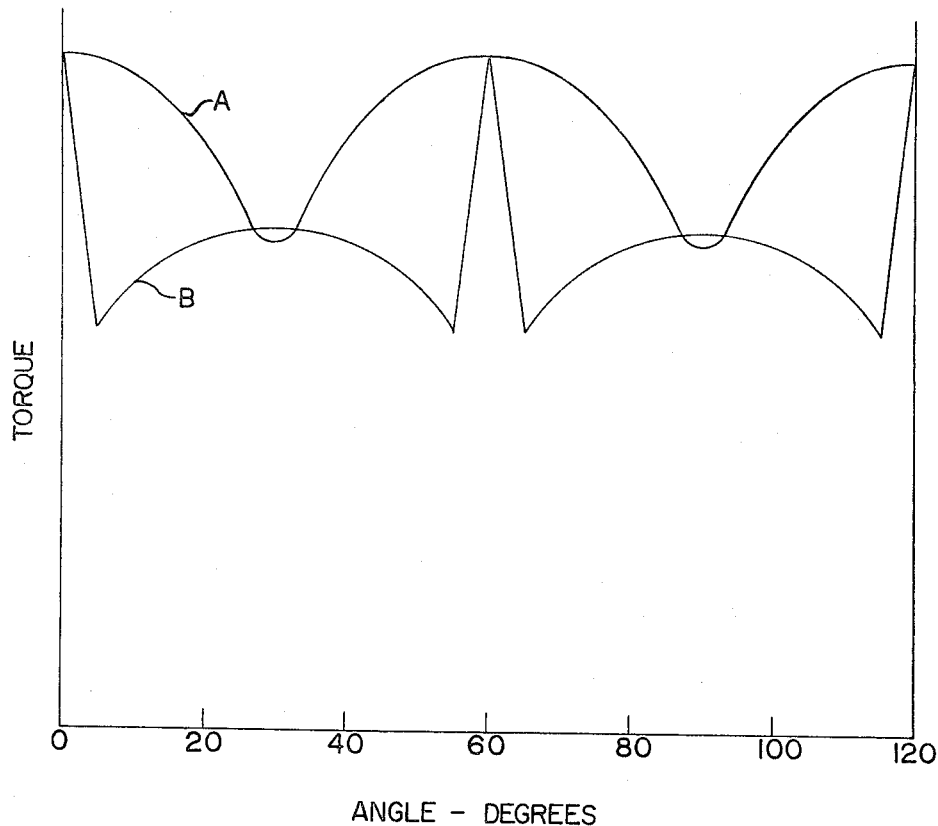
FIG. 7 shows the motor torque-angle curves for the double brush as compared with the conventional brush arrangement.

The action of the double brush arrangement in smoothing out the torque-angle curve of the motor is illustrated in graphic form in FIG. 7. The curve A shows the torque variation with the double brush spaced at an angle of about 50 degrees while the curve B shows the torque variation with a single set of brushes arranged diametrically opposite on the commutator in a conventional manner. It will be noted that the torque variations shown in curve A are relatively smooth while those indicated by curve B show steep transients at 60 degree intervals of motor rotation. These peaks occur during the small angular range where commutator segments are shorted by the brush passing between adjacent segments. Such transient peaks tend to produce instability and jitter in a servo system especially where there is no gear reduction between the motor and output shaft and where the motor acts against the biasing force of a return spring.

The double brush has an important additional advantage in that it minimizes sparking of the brushes by providing an additional path for discharge of the inductive kick in the field windings which permits gradual decay of the inductive current.

FIG. 5 illustrates an application of the torque motor in a servo system used to position the pointer of an indicating instrument. For this application the torque motor supplies a torque driving the output shaft 15 and pointer 22 in a clockwise (upscale) direction while a suitable spiral biasing spring 48 having one end anchored to the frame 10 and the other attached to shaft 15 provides a counter torque in a direction to drive shaft 15 in a counterclockwise (downscale) direction. D.C. power from a suitable source 49 is supplied to brush terminals 46 and 47 through a collector 50 and an emitter 51 of a control transistor 52. Biasing voltage supplied to base 53 of transistor 52 by an operational amplifier 54 controls the flow of motor current through the transistor.

An input measurement signal voltage $E_S$ supplied from a suitable transducer (not shown) which may, for example, be indicative of a measured quantity such as temperature, pressure, etc., is fed to an input terminal 55a of amplifier 54. The voltage developed across the wiper 35 and the terminal 45 of the follow-up potentiometer is fed to another amplifier input terminal 55b. The operational amplifier 54, which is of known construction, is characterized by having an output voltage of one polarity when the voltage applied to input terminal 55a exceeds that applied to the other input terminal 55b and an output voltage of the opposite polarity when the input voltage to input terminal 55b exceeds that applied to input terminal 55a. Polarities are chosen so that when the input signal $E_S$ exceeds that across the follow-up potentiometer the transistor 52 is turned on and passes current to the torque motor causing it to drive the shaft 15 and pointer 22 upscale against the bias of spring 48. When a balanced position is reached determined by the output voltage of the follow-up potentiometer, the motor torque balances the spring torque and the pointer stops at a position indicative of the measured quantity as indicated by the signal voltage $E_S$. If the measured quantity and the voltage $E_S$ decreases, the voltage applied to the amplifier input terminal 55b exceeds that applied to input terminal 55a and transistor 52 cuts off the motor current permitting the spring 48 to rotate shaft 15 and pointer 22 downscale until the output voltage of the follow-up potentiometer is reduced sufficiently to restore balance at a new lower position dependent on the value of the measurement signal $E_S$. In the event of a power failure, the spring 48 acts to drive the pointer 22 counter-clockwise beyond the zero position to an "off" position thus indicating, in a reliable manner, loss of power.

During the time when the transistor is biased to shut off the motor current, it is desirable to provide a discharge path for the inductive energy stored in the motor field windings. For this purpose, a diode 56 is connected across the motor input terminals 46 and 47 and polarized, as shown, to pass only back EMF voltage.

A D.C. torque motor constructed in accordance with this invention has been found to provide deadbeat (no hunting) operation when used in the instrument servo system described above. One sample which provided adequate output torque, i.e. 160 gram-centimeters, to drive an instrument pointer without gearing, had an outer diameter of 1.625 inches, and a rotor diameter of 0.625 inch, weighed five ounces, and required only one watt of input power including losses in the electronic circuitry.

Figure 8A:
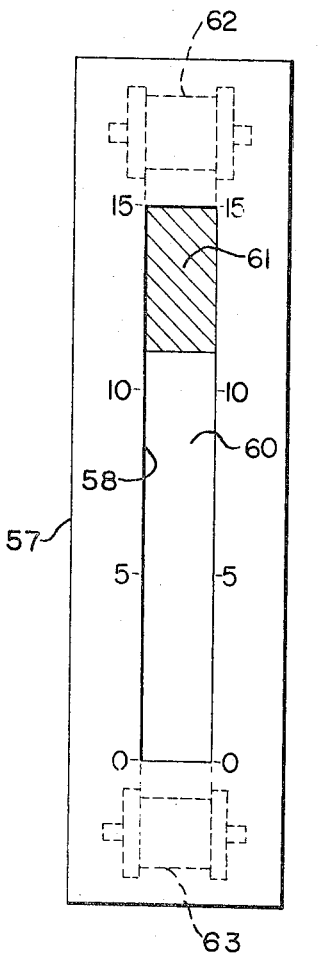
FIG. 8 illustrates how the torque motor may be used to drive a tape-type of instrument display.
Figure 8B:
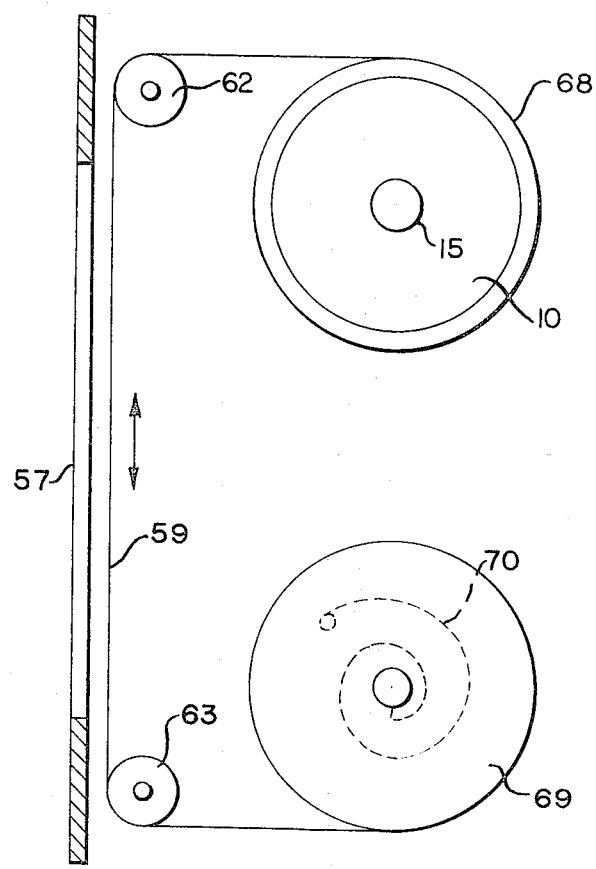

FIGS. 8A and 8B show schematically front and side views of an instrument having a tape-type display powered by the torque motor and servo system as described above. An instrument faceplate 57 has a rectangular opening 58 through which is viewed an indicating tape 59 designed to provide a thermometer type of indication at the junction of light and dark portions of the tape 60 and 61. The tape 59 runs over idler pulleys 62 and 63 between a drum 68 driven by the motor shaft 15 and a rotatably mounted take-up reel 69. For this application a spiral spring 70 biasing the reel 69 for rotation in a counter-clockwise direction as viewed in FIG. 8B maintains tension in the tape and provides a biasing force in a downscale direction in a manner similar to the spring 48 of FIG. 5. Thus the vertical movements of the tape provide an indication of a measured quantity in response to variations in the measurement signal $E_S$. Because of its stable operation, small size, high torque, light weight and low power consumption, the torque motor of the present invention is well suited for driving tape-type instrument displays without need for gearing as well as pointer and other types of instrument displays and controlled devices.

While there have been shown what are presently considered to be preferred embodiments of the invention, it will be apparent to those skilled in the art that various changes and modifications may be made without departing from the spirit and scope of the invention.

What is claimed as new and desired to be secured by Letters Patent of the United States is:

1. A torque motor comprising:
   (a) a frame supporting a rotatable shaft,
   (b) a magnetized rotor mounted on said shaft,
   (c) a magnetic field structure mounted on said frame having pole pieces disposed around said rotor, each of said pole pieces having a field winding,
   (d) a commutator supported by said frame having a plurality of angularly-spaced commutator segments,
   (e) a brush assembly connected to be rotated by said shaft having two pairs of brushes engaging said commutator segments on diametrically opposite sides thereof,
   (f) a pair of power connections, one being connected to one of said brush pairs and the other to the other of said brush pairs,
   (g) each brush of each pair being spaced from the other paired brush by an angular amount substantially greater than the angular spacing between adjacent commutator segments whereby sudden torque changes caused by commutator switching of said power connections to said field windings during rotation of said rotor are avoided.

2. A torque motor as recited in claim 1 wherein the magnetic field structure has three pole pieces spaced 120 degrees apart and the field windings on the pole pieces are connected in delta.

3. A torque motor as recited in claim 2 wherein the commutator has three segments each having an angular width of slightly less than 120 degrees and the three junctions between the field windings are connected respectively to the three commutator segments.

4. A torque motor as recited in claim 3 wherein the angular spacing between the paired brushes is greater than 45 degrees but less than 60 degrees.

5. A torque motor as recited in claim 3 wherein the angular spacing between the paired brushes is approximately 50 degrees.

6. A torque motor adapted for use in a servo system of the null-balance type comprising:
   (a) a frame supporting a rotatable shaft,
   (b) a magnetized rotor mounted on said shaft,
   (c) a field structure supported by said frame and surrounding said rotor,
   (d) a plate member mounted on said frame carrying slip rings, commutator segments and a potentiometer resistance element arranged in a series of concentric rings formed of electrically conducting material, and
   (e) a brush assembly mounted on said shaft to rotate therewith carrying a plurality of brushes engaging said slip rings, commutator segments and potentiometer resistance element to make rotating electrical contact therewith.

7. A torque motor for positioning an indicating instrument in accordance with an electrical control signal applied thereto comprising:
   (a) a frame,
   (b) a field structure, commutator and potentiometer resistance element connected to said frame,
   (c) a shaft rotatably mounted on said frame for driving said instrument,
   (d) means including a magnetized rotor, a brush assembly having brushes engaging said commutator and a potentiometer wiper engaging said potentiometer resistance element mounted on said shaft for applying a torque to rotate said shaft in an upscale direction to a balanced position determined by the position of said wiper on said potentiometer resistance element,
   (f) and a biasing means applying a counter torque to said shaft in a downscale direction.

8. A torque motor as recited in claim 7 wherein the brush assembly carries two pairs of brushes engaging said commutator on diametrically opposite sides thereof, each pair of brushes being electrically connected and angularly spaced around said commutator to prevent oscillation of said shaft due to sudden torque changes.

9. A torque motor for driving an indicating instrument having an indicating tape moving between a driving drum and a take-up reel, said reel being biased to move the tape in a downscale direction, said torque motor comprising:
 (a) a frame,
 (b) a field structure, commutator and potentiometer resistance element connected to said frame,
 (c) a shaft rotatably mounted on said frame for driving said drum, and
 (d) means including a magnetized rotor, a brush assembly having brushes engaging said commutator and a potentiometer wiper engaging said potentiometer resistance element mounted on said shaft for applying a torque to rotate said shaft and drum in an upscale direction to a balanced position determined by the position of said wiper on said potentiometer resistance element.

10. A torque motor as recited in claim 9 wherein the brush assembly carries two pairs of brushes engaging said commutator on diametrically opposite sides thereof, each pair of brushes being electrically connected and angularly spaced around said commutator to prevent oscillation of said shaft due to sudden torque changes.

References Cited

UNITED STATES PATENTS

| | | | |
|---|---|---|---|
| 1,545,422 | 7/1925 | Graichen | 310—231 |
| 2,702,871 | 2/1955 | Sparklin | 310—72 |
| 2,629,075 | 2/1953 | Deschman | 310—237 X |
| 2,688,679 | 9/1954 | Schleuning | 310—237 X |
| 2,739,278 | 3/1956 | Blankenship | 310—231 X |
| 2,818,518 | 12/1957 | Phaneuf et al. | 310—237 X |
| 2,868,469 | 1/1959 | Sullivan | 242—55 |
| 3,040,223 | 6/1962 | Buhrendorf | 310—36 X |
| 3,047,751 | 7/1962 | Hudson | 310—68 X |
| 3,329,909 | 7/1967 | Blonder | 310—36 X |

DONOVAN F. DUGGAN, Primary Examiner

U.S. Cl. X.R.

310—72, 148, 237